Dec. 16, 1969     P. D. SANTILHANO     3,484,574
METHOD OF WELDING
Filed April 18, 1967
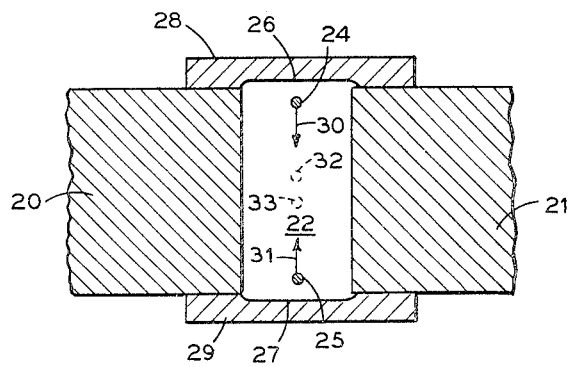
INVENTOR.
Philip D. Santilhano
BY
ATTORNEY United States Patent Office 3,484,574
Patented Dec. 16, 1969

3,484,574
METHOD OF WELDING
Philip D. Santilhano, 10 Cross Road, Meiklerigss,
Paisley, Scotland
Filed Apr. 18, 1967, Ser. No. 631,671
Claims priority, application Great Britain, Apr. 22, 1966,
17,807/66
Int. Cl. B23k 9/18
U.S. Cl. 219—73                            8 Claims

ABSTRACT OF THE DISCLOSURE

An electro-slag welding process using two or more welding electrodes in which the electrodes are oscillated along the weld out of unison with each other. This facilitates the dispersion of heat from the weld.

This invention relates to welding by the electroslag process. In this process, when welding plates having a thickness in excess of about ten centimetres (i.e. the gap depth) it is usual to use two or more welding electrode wires fed from a single welding head and, when the depth of the gap per electrode exceeds about six centimetres, it is usual to effect oscillation of the welding head to move the welding electrode wires in unison to and fro in the direction of the depth of the gap.

According to the present invention there is provided apparatus for depositing a weld by the electroslag process including a plurality of independently oscillatable welding heads oscillatable along the weld out of unison.

Preferably adjacent welding heads are arranged to oscillate out of phase, suitably 180 degrees out of phase between adjacent welding heads. Thus, in an arrangement utilizing a pair of electrode wires, the associated welding heads move to supply the respective electrode wires towards outer regions of the weld pool adjacent the front and rear faces thereof and then move to traverse the wires across the respective halves of the weld pool and to supply the wires towards the centre of the weld pool, oscillating to and fro between these positions at a predetermined rate and dwelling at each position for a predetermined period. The rate of oscillation and period of dwell at the end of a stroke of each head may be varied by adjustable oscillation motion and dwell stops fitted to each welding head to suit the working conditions.

By way of example, when welding mild steel workpieces of up to 35 centimeters in thickness using a pair of electrode wires of between 1.2 millimeters and 2.4 millimeters diameter supplied from independently oscillatable welding heads the welding parameters may suitably be those described in the specification of my U.S. patent application Ser. No. 320,842.

The pair of welding heads are oscillated to and fro along the depth of the weld from a single drive motor, but the drive is arranged so that the heads do not move in unison along the depth of the weld. Alternatively, the welding heads may be oscillated from separate drive motors, thereby facilitating varying of the oscillation cycles whilst welding is in progress to accommodate variations in the weld form.

BRIEF DESCRIPTION OF THE DRAWING

The figure shows a diagrammatic sectional plan view of an arrangement of electrodes according to the invention.

DESCRIPTION OF THE PREFERRED EMBODIMENT

Thus, referring to the accompanying drawing, when welding mild steel workpieces 20, 21 with a pair of electrodes 24, 25 in the general manner described in the aforesaid specification by producing a weld pool 22 by the electro-slag process, each electrode 24, 25 is held adjacent the respective weld face 26, 27 bounded by respective copper shoes 28, 29 for between 0 and 10 seconds; then both electrodes are traversed inwardly as indicated by the arrows 30, 31 towards the centre positions 32, 33 indicated in broken line outline in between 2 and 28 seconds; held at the centre positions 32, 33 of the weld for between 0 and 10 seconds; and then traversed outwardly toward the respective outer face 26, 27 in between 2 and 28 seconds, there to recommence the cycle. The dwell time adjacent the outer faces 26, 27 of the weld and at the centre positions 32, 33 are not necessarily the same. In a particular example, a dwell of 4 seconds adjacent the outer faces 26, 27 and no dwell at the centre positions 32, 33 of the weld was utilized.

Whilst in the foregoing example the electrode oscillation is 180° out of phase, it will be appreciated that other phase differences may be utilized. Similarly, when three or more electrodes are utilized adjacent electrodes may be oscillated 180° out of phase, so that alternate electrodes oscillate in unison, or each of the electrodes may be oscillated out of phase to the remainder.

By oscillating adjacent electrodes along the depth of the gap out of phase the heat input into the central region of the weld is reduced compared with an arrangement in which adjacent electrodes are oscillated in unison, thereby enhancing the structure of the weld.

Whilst this invention may be utilized with advantage in any electro-slag welding process it is of particular utility when utilized in conjunction with the process described in the aforesaid specification since, as hereinbefore mentioned, the present invention tends to reduce the heat input into the weld.

I claim:
1. In a method of electro-slag welding in which a plurality of electrodes are oscillated to and fro along the depth of a weld pool, the improvement comprising, oscillating the electrodes out of unison.

2. The method of welding as claimed in claim 1, further comprising, holding each electrode at rest for a predetermined time interval at the limit of the oscillation path thereof remote from the center of the weld pool.

3. The method of welding as claimed in claim 1, further comprising, holding each electrode at rest for predetermined time intervals at both limits of the oscillation path thereof.

4. The method of welding as claimed in claim 1, wherein the oscillating step comprises, oscillating the electrodes 180° out of phase and dwelling each electrode for a period of up to 10 seconds at the limit of its oscillation path remote from the center of the weld pool.

5. The method of welding as claimed in claim 1, wherein the oscillating step comprises, oscillating the electrodes 180° out of phase and dwelling each electrode for a period of up to 10 seconds at both limits of the oscillation path thereof.

6. The method of welding as claimed in claim 1, wherein the oscillating step comprises, oscillating the electrodes 180° out of phase and taking between 2 and 30 seconds for each stroke thereof and dwelling each electrode for a period of up to 10 seconds at the limit of the oscillation path thereof remote from the center of the weld pool.

7. The method of welding as claimed in claim 1, wherein the oscillating step comprises, oscillating the electrodes 180° out of phase and taking between 2 and 30 seconds for each stroke thereof and dwelling each electrode for a period of up to 10 seconds at both limits of the oscillation path thereof.

8. The method as claimed in claim 1, wherein the oscillating step comprises, oscillating the electrodes 180° out of phase taking between 2 and 30 seconds for each stroke thereof and holding each electrode at rest for 4 seconds at the limit of the oscillation path thereof remote from the center of the weld pool.

References Cited

UNITED STATES PATENTS

| | | | |
|---|---|---|---|
| 2,472,803 | 6/1946 | Beyer et al. | 219—125 |
| 2,817,748 | 12/1957 | Meyer | 219—126 |
| 3,211,887 | 10/1965 | Cotterman | 219—126 |

JOSEPH V. TRUHE, Primary Examiner

C. L. ALBRITTON, Assistant Examiner

U.S. Cl. X.R.

219—137